United States Patent [19]

Armstrong

[11] 4,376,548
[45] Mar. 15, 1983

[54] END FITTINGS FOR CONDUITS

[76] Inventor: Kenneth W. Armstrong, 'Curylgates', 150 Ambleside Rd., Lightwater, Surrey, England

[21] Appl. No.: 213,761

[22] Filed: Dec. 5, 1980

[30] Foreign Application Priority Data

Dec. 6, 1979 [GB] United Kingdom ................. 7942127

[51] Int. Cl.³ ............................................ F16L 33/20
[52] U.S. Cl. .................................. 285/149; 285/251; 285/256; 285/DIG. 4
[58] Field of Search ............... 285/256, 149, 252, 253, 285/259, 251, DIG. 4

[56] References Cited

U.S. PATENT DOCUMENTS

| 746,497 | 12/1903 | Greenfield | 285/253 X |
| 1,634,153 | 6/1927 | Long | 285/252 X |
| 1,775,128 | 9/1930 | Hunter | 285/259 |
| 2,309,719 | 2/1943 | Vaill | 285/149 |
| 2,614,304 | 10/1952 | Oetiker | 285/256 X |
| 3,023,496 | 3/1962 | Millar | 285/149 X |
| 3,381,981 | 5/1968 | Wilson | 285/149 |
| 3,393,267 | 7/1968 | Busse | 285/149 X |
| 4,021,061 | 5/1977 | Zimmerman | 285/255 X |

FOREIGN PATENT DOCUMENTS

| 2804629 | 8/1978 | Fed. Rep. of Germany | 285/253 |
| 1400442 | 4/1965 | France | 285/256 |

Primary Examiner—Thomas F. Callaghan
Attorney, Agent, or Firm—Pollock, Vande Sande & Priddy

[57] ABSTRACT

An end fitting for a sheathed, convoluted conduit comprises a generally tubular body member having a threaded portion adjacent one end for screwing into the conduit bore and a frusto-conical portion spaced from the threaded portion which tapers inwardly away from that one end and around which the sheath of the conduit is to be received, and clamping means for clamping the sheath against the frusto-conical surface comprising an annulus surrounding the frusto-conical portion which is deformable to conform to the frusto-conical portion.

The body further includes a plain cylindrical portion intermediate the threaded and frusto-conical portions for receiving the end few convolutions of the conduit and defining a radial shoulder against which the conduit end is to abut, and means adjacent the other end for mounting the fitting on a support.

4 Claims, 3 Drawing Figures

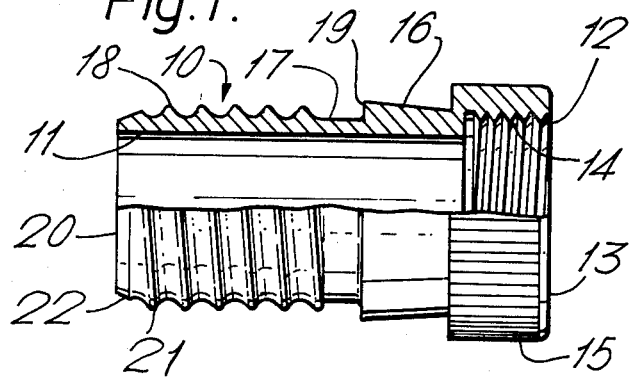
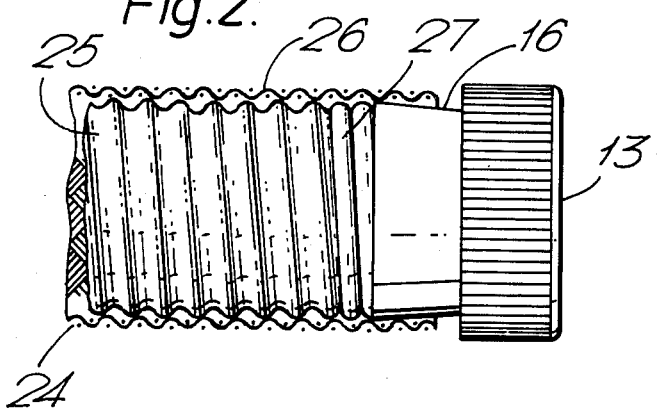
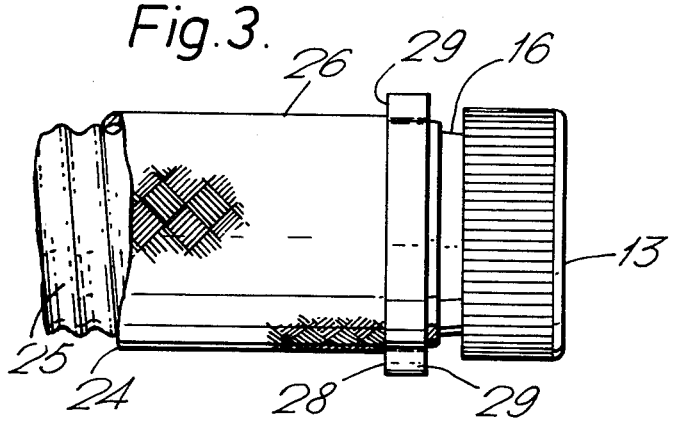

END FITTINGS FOR CONDUITS

This invention relates to end fittings for conduits.

The invention is especially concerned with end fittings for use with conduits of the kind which are flexible and which comprise convoluted tube that is sheathed in a reinforcing layer of, for example, braided metal wire. The end fittings are for mounting a said conduit on a support or for coupling a pair of said conduits.

According to the present invention, there is provided an end fitting for a conduit of the kind having a convoluted tube and an outer reinforcing sheath comprising a tubular member having a first portion adjacent one end thereof that includes means for cooperating with the convoluted tube of a said conduit to facilitate screwing of the first portion into the bore of said convoluted tube, a second portion remote from the said one end of the tubular member defining a frusto-conical surface which tapers inwardly away from the said one end and which is to receive the outer sheath of the conduit therearound, and means for clamping the sheath against the said tapered frusto-conical surface of the second portion.

The clamping means may comprise an annulus which extends around the tapered frusto-conical surface of the second portion, and which is deformable so as to reduce its diameter and conform with said frusto-conical surface thereby to clamp a part of the sheath of the conduit disposed between the annulus and the frusto-conical surface against the frusto-conical surface.

The tubular member preferably includes a radially-extending shoulder between the first and second portions of the tubular member which may extend completely around the tubular member and against which the end of the convoluted tube of the conduit is to abut.

This shoulder may be defined by a third portion of the tubular member intermediate the said and second portions. The third portion may also define a generally cylindrical surface between the said first portion and the said shoulder around which convolutions of the convoluted tube of the conduit adjacent its end are to be received.

The end of the tubular member remote from said one end may include means for mounting the end fitting on a support.

An end fitting for a conduit comprising a convoluted tube surrounded by a reinforcing layer and in accordance with the present invention will now be described, by way of example, with reference to the accompanying drawing in which:

FIG. 1 is a side view of the end fitting partly in cross-section;

FIG. 2 is a side view of the end fitting at one stage during its mounting on the conduit and showing the conduit partly in cross-section; and FIG. 3 is a side view of the end fitting mounted on the conduit.

Referring to the drawing, the end fitting is for a flexible conduit that may be used to carry electrical conductors, and serves to mount the conduit on a support member. The conduit is of conventional form and comprises an inner flexible tube that is helically corrugated to define convolutions, and an outer reinforcing sheath of braided metal wires that protects the inner tube. The convoluted inner tube may be formed from P.T.F.E. material or any other suitable material.

Referring in particular to FIG. 1, the end fitting comprises a tubular body member 10 which is machined from a unitary piece of mild steel or aluminium alloy and plated with cadmium, and which has an axial bore 11 extending completely therethrough. The bore 11 is generally of constant diameter for a substantial part of the length of the body member 10 and is stepped to define an annular recess 12 adjacent one end 13 of the fitting. The recess 12 is provided with an internal thread 14, centered on the longitudinal axis of the bore 11, to facilitate mounting of the fitting on a metal support (not shown). Surrounding the recess 12 is a cylindrical portion 15 of the tubular body member 10 that is straight knurled to enable the fitting to be gripped firmly and manually rotated.

The remaining external surface of the fitting is constituted by three portions, 16, 17 and 18, of the body member 10 which define respectively a smooth frusto-conical surface adjacent the portion 15, and of less overall external diameter than the portion 15, that tapers inwardly towards the end 13 of the fitting at an angle of approximately three degrees with respect to the axis of the body member 10; a generally smooth cylindrical surface adjacent to, and of less overall diameter than the portions 16 and 18 and provides a radially extending abutment surface 19 around the body member 10 immediately adjacent the portion 16; and a screw-thread extending from adjacent the portion 17 to the other end, 20, of the fitting.

The screw-threaded portion 18 of the fitting includes a ridge 21 that extends helically around the periphery of the portion 18 to define a single-start screw-thread whose pitch and width is regular and corresponds approximately with that of the helical corrugation of the inner convoluted tube of the conduit such that the ridge 21 is capable of engaging in and cooperating with the corrugation of the conduit to enable the conduit to be screwed onto the fitting. The height of the ridge 21 decreases progressively towards the end 20 of the fitting and the end 20 itself is tapered at 22 to facilitate introduction of the portion 18 into the bore of the conduit.

Mounting of the fitting into a conduit will now be described with reference to FIGS. 2 and 3 of the drawing which show the conduit, generally referenced at 24, as comprising an inner convoluted tube 25 and an outer, concentric reinforcing sheath 26 of braided metallic wires. To mount the conduit 24 on the fitting, the end of the conduit is first slid over the end 20 of the fitting such that the tapered end 22 enters into the bore of the conduit 24. Thereafter, by rotating the conduit 24 with respect to the fitting, the ridge 21 of the screw-threaded portion 18 of the fitting engages with the helical corrugation of the tube 25 and the conduit screws onto the portion 18. Screwing is continued until the end of the conduit 24 passes over the portion 18 and abuts the radially extending shoulder 19 defined between the portions 16 and 17 of the fitting, at which time a resistance to screwing is felt.

The abutment surface 19 prevents any further displacement of the end of the conduit 24 axially of the fitting so that, upon further rotation of the conduit 24 with respect to the fitting, the convolutions of the tubular member 25 of the conduit 24 adjacent its end are compressed over the region defined by the smooth cylindrical surface of the portion 17 of the fitting.

FIG. 2 shows a typical conduit screwed onto the fitting in this manner. The axial length of the cylindrical portion 17 of the fitting is such that two or possibly three convolutions of the inner tubular member 25 of the conduit adjacent its end are compressed thereabout (as indicated at 27) to approximately one half or one third their normal, that is, uncompressed, axial dimension. The external diameter of the portion 17 is suitably dimensioned with respect to the portions 16 and 18 to accommodate compressed convolutions of the conduit therein without undue radial expansion.

The axial length of the cylindrical portion 17 of the fitting may be increased if desired so that more than three adjacent convolutions of the conduit 24 can be compressed thereabout in the aforementioned manner.

The convolutions of the conduit 24 that are compressed around the cylindrical portion 17 serve to inhibit rotation and axial displacement of the conduit 24 with respect to the fitting thereby to maintain the end of the conduit on the fitting.

A suitable sealant may be applied to the trough of the screw thread of the portion 18 of the fitting prior to screwing of the conduit end thereon to prevent the ingress of moisture into the bore of the conduit once assembly has been completed and also further to inhibit withdrawal of the conduit from the fitting.

Following screwing of the end of the conduit 24 onto the portion 18 of the fitting and compression of the convolutions around the portion 17, the end of the braided sheath 26 (shown in cross-section in FIG. 2) which normally would encompass those convolutions of the conduit that have been compressed, is passed over the frusto-conical surface defined by the portion 16 of the fitting. Thereafter a clamping band, which may comprise a generally cylindrical metal annulus having a pair of diametrically opposed ears, is slid over the braided sheath 26 and the portion 16 and its ears pinched by pincers so as to reduce its overall diameter and thereby effect clamping of the braided sheath 26 against the tapered surface of the portion 16. FIG. 3 illustrates the assembled fitting and conduit 24 with the ears, indicated at 29, of a clamping band 28 being pinched to clamp the braided sheath 26 of the conduit 24 onto the portion 16.

During the pinching operation, the clamping band 28 is deformed such that its internal peripheral surface, which prior to pinching is cylindrical, conforms with the taper of the portion 16 and decreases in diameter towards the end 13 of the fitting. The cooperating tapered surfaces of the portion 16 of the fitting and the clamping band 28 thus formed clamp the sheath 26 therebetween. Any attempt to withdraw the sheath 26 from the fitting would tend to move the clamping band 28 in a direction away from the end 13 of the fitting and thereby result in those cooperating tapered surfaces gripping the sheath 26 even more tightly. In this way, the braided sheath 26 is firmly secured on the fitting. The clamping of the sheath 26 in the aforementioned manner serves both to prevent withdraw of the conduit 24 from the fitting and to ensure earthing continuity between the braided sheath 26 and the fitting should this be required.

In some circumstances, it may be desirable to increase the amount of the sheath 26 available for clamping on the portion 16 of the fitting above that provided by compression of the convolutions adjacent the end of the conduit alone. In this case, the inner tubular member 25 of the conduit may be cut back shorter than the sheath 26 prior to the mounting of the fitting thereon.

In alternative embodiments, the end fitting may have an external screw thread or include a screw-threaded ring captively mounted on the tubular member 10 and rotatable with respect thereto for facilitating attachment of the end fitting to a support member rather than the internal screw thread 14 shown in FIG. 1. In these cases, the bore 11 may be of constant diameter throughout the length of the tubular body member 10.

Furthermore, the end fitting may be attached to a support member, which may comprise a conduit coupling element such as, for example, a T-coupling, by any suitable means other than screwing. For example, the end fitting may be welded to the support member in which case the end fitting need not incorporate a screw-thread.

I claim:

1. An end fitting for a conduit of the kind having a convoluted tube and an outer reinforcing sheath comprising, a tubular member having a first portion adjacent one end thereof that includes means for co-operating with the convoluted tube of said conduit to facilitate screwing of the first portion into the bore of said convoluted tube, a second portion remote from the said one end of the tubular member defining a frusto-conical surface which gradually tapers inwardly away from the said one end and which is to receive the outer sheath of the conduit therearound, a third portion intermediate said first and second portions which defines a generally plain cylindrical surface of less overall diameter than the first and second portions around which convolutions of the convoluted tube of the conduit adjacent its end are to be received and a radially-extending shoulder adjacent the second portion against which the end of the convoluted tube is to abut, and means for clamping the sheath against the said tapered frusto-conical surface of the second portion, said clamping means comprising an annulus which extends around the tapered frusto-conical surface of the second portion of the said tubular body and which is deformable so as to reduce its internal diameter and conform with said frusto-conical surface, thereby to clamp the sheath of the conduit against the frusto-conical surface.

2. An end fitting according to claim 1, wherein said radially-extending shoulder extends completely around the tubular member.

3. An end fitting according to claim 1, wherein said first portion of the tubular member includes a ridge extending helically around said first portion and terminating adjacent said third portion for co-operating with the convolutions of the convoluted tube of the conduit to facilitate screwing of the said first portion into the bore of the convoluted tube.

4. An end fitting according to claim 1, wherein the other end of the tubular member includes means for mounting the end fitting on a support.

* * * * *

UNITED STATES PATENT AND TRADEMARK OFFICE
CERTIFICATE OF CORRECTION

PATENT NO. : 4,376,548
DATED : March 15, 1983
INVENTOR(S) : Kenneth W. Armstrong It is certified that error appears in the above—identified patent and that said Letters Patent is hereby corrected as shown below:

On the title page, add item [73] as follows:

-- Assignee: Smiths Industries Public Limited Company, London, England--.

Signed and Sealed this

Thirteenth Day of December 1983

[SEAL]

Attest:

Attesting Officer

GERALD J. MOSSINGHOFF

Commissioner of Patents and Trademarks